United States Patent [19]

Fujiwara et al.

[11] Patent Number: 5,234,387

[45] Date of Patent: Aug. 10, 1993

[54] TOOTHED BELT AND METHOD FOR PRODUCING THE SAME

[75] Inventors: Toru Fujiwara, Torokozawa; Yoshinori Ito, Hanno, both of Japan

[73] Assignee: Tsubakimoto Chain Co., Osaka, Japan

[21] Appl. No.: 990,451

[22] Filed: Dec. 15, 1992

[30] Foreign Application Priority Data

Dec. 17, 1991 [JP] Japan ................ 3-352898

[51] Int. Cl.5 ............................................. F16G 5/06
[52] U.S. Cl. ........................................ 474/205; 474/268
[58] Field of Search ............. 474/204, 205, 260, 261, 474/264, 265, 266, 268, 270

[56] References Cited

U.S. PATENT DOCUMENTS

| | | | |
|---|---|---|---|
| 4,721,496 | 1/1988 | Yokoyama et al. | 474/268 X |
| 4,826,472 | 5/1989 | Sato et al. | 474/205 X |
| 4,832,673 | 5/1989 | Nagai et al. | 474/268 X |
| 4,838,843 | 6/1989 | Westhoff | 474/205 X |

FOREIGN PATENT DOCUMENTS 269743 10/1989 Japan.

*Primary Examiner*—Thuy M. Bui
*Attorney, Agent, or Firm*—Howson and Howson

[57] ABSTRACT

A toothed belt comprises an organic peroxide crosslinked hydrogenated nitrile rubber composition, having a co-crosslinking agent comprising N, N'-phenylene dimaleimide in combination with at least one substance from the group consisting of a higher ester of an organic acid, a metal salt of acrylic acid and a metal salt of methacrylic acid. The belt is characterized by excellent heat resistance and resistance to tooth slippage at higher temperatures under higher loads, and is useful as the toothed belt in a camshaft drive for high performance automobile engine.

3 Claims, 1 Drawing Sheet

TOOTHED BELT AND METHOD FOR PRODUCING THE SAME

BRIEF SUMMARY OF THE INVENTION

This invention relates to toothed belts for use in a power transmission, for example in the camshaft drive of an automobile engine, and more particularly to an improved rubber composition for use in such belts.

For conventional toothed belts for use in the camshaft drive of automobile engines (abbreviated as belt hereinafter), rubber made primarily of chloroprene is employed as the body rubber. Recently, a demand has developed for high performance in automobile engines. However, high performance brings about an increase in engine temperature and increased loading of the camshaft drive.

Conventional belts in which the rubber is primarily made from chloroprene lack heat resistance and do not satisfactorily meet the demand for the high loading. Alternatively, belts having body rubber made primarily with chlorosulfonated polyethylene, and belts made primarily with sulfur crosslinking hydrogenated nitrile, have been developed. However, improvements in the performance of automobile engines are ongoing. The ability of a toothed belt to withstand the high loadings and temperatures expected in future high performance engines has not yet satisfactorily been achieved.

In order to improve heat resistance, the use of a peroxide crosslinking-hydrogenated nitrile rubber composition containing terminally carboxylated polybutadiene as a co-crosslinking agent has been proposed (Japanese Laid-open Patent No. 269743/1989). However, although the toothed belt described in this Japanese Patent is excellent in terms of heat resistance, it does not satisfactorily resist tooth slippage or skipping, especially at high temperatures under high loads.

The present invention provides a toothed belt made of a novel rubber composition capable of resisting tooth slippage at high temperatures and high loads. This belt is particularly useful in the camshaft drives of automobile engines, i.e. for connection between the crankshaft and camshaft.

In accordance with the invention, it has been discovered that, by concurrently using specific compounds as the co-crosslinking agent for the organic peroxide crosslinked-hydrogenated nitrile rubber composition constituting the tooth rubber and back rubber, a toothed belt having excellent resistance to tooth slippage at high temperatures can be obtained.

The principal object of the invention is to provide a toothed belt for use in a power transmission, having an excellent life span, high heat resistance, and high resistance to skipping even at high temperatures under high loads. It is also an object of the invention to provide a toothed belt which has a high heat resistance and resistance to skipping and which is also characterized by high elasticity.

In accordance with the invention, in a toothed belt comprising tooth rubber, back rubber, a tension member, and a tooth cloth, the tooth rubber and the back rubber are made of an organic peroxide crosslinked hydrogenated nitrile rubber composition wherein at least one crosslinking agent is selected from the group consisting of a higher ester of an organic acid, a metal salt of acrylic acid and a metal salt of methacrylic acid, and the other crosslinking agent is N, N'-m-phenylene dimaleimide.

Other aspects and advantages of the invention are described further in the following detailed description.

DETAILED DESCRIPTION

Figure 1:
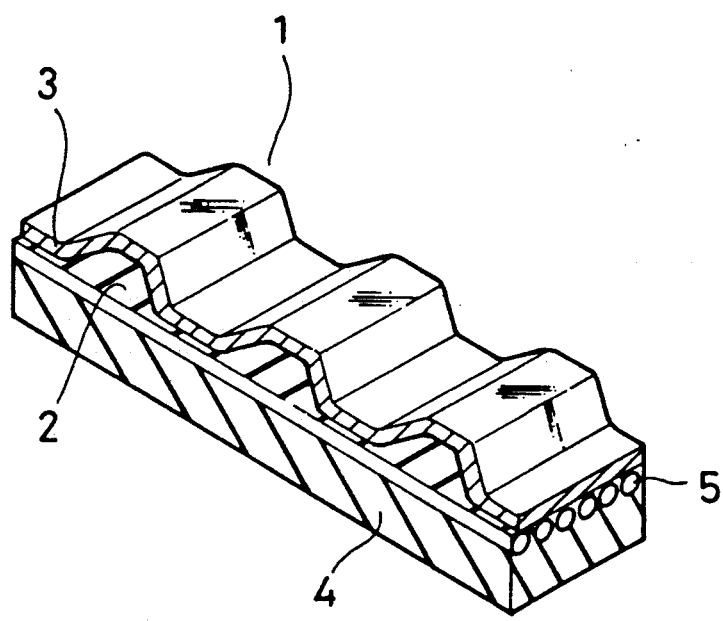
FIG. 1 is a perspective view of a portion of a toothed belt in accordance with the invention.

Intensive investigations by the inventors, in order to achieve the objectives stated above, have revealed that the heat resistance and resistance to skipping of a toothed belt made of a peroxide crosslinked hydrogenated nitrile rubber is dramatically enhanced when specific types of co-crosslinking agents are used concurrently.

As shown in FIG. 1, in the toothed belt in accordance with the invention, tooth 1 comprises tooth rubber 2 protruding from the backing rubber 4 wherein a tension member, consisting of core wires 5, is embedded. Tooth cloth 3 is bonded onto the outer surface of the tooth rubber 2.

In order to produce the toothed belt, tooth cloth impregnated with rubber paste is wound on a mold having grooves in the form of the belt teeth. In the bonding process, the tension members are wound. This is followed by the winding of the tooth rubber and unvulcanized rubber-compounded sheet working as the back rubber. Then, molding and vulcanization are effected using conventional methods in a pressurized chamber. The resulting product is drawn out and cut to a desired width to provide a belt in the form of a closed loop.

The invention is characterized by improved properties in the body rubber, which is constituted by the tooth rubber and back rubber. In this body rubber, an organic peroxide crosslinking hydrogenated nitrile rubber composition is used, containing, as a co-crosslinking agent, N, N'-m-phenylene dimaleimide in combination with at least one compound selected from the group consisting of a higher ester of an organic acid, a metal salt of acrylic acid and a metal salt of methacrylic acid.

The tooth cloth may be selected from any suitable cloth by one of skill in the art. Such suitable cloths include, for example, any cloth produced by weaving polyamide fiber, polyaramide fiber, polyester fiber and the like. The tooth cloth is impregnated with a rubber paste produced by adding an organic compound having an isocyanate group to a rubber solution produced by dissolving, in an organic solvent, the same hydrogenated nitrile rubber composition as the body rubber, prior to the bonding of the tooth cloth to the surface of the tooth rubber and that of the back rubber.

As the tension member, there may generally be used a core wire produced by twisting glass fiber, aramide fiber, metal fiber and the like. The tension member is also impregnated with a solution of an adhesive, prior to use. A solution produced by mixing latex with an aqueous solution of RF latex resin (RFL) obtained by reacting resorcinol and formalin (RF) is generally used.

A tension rubber produced by overcoating a rubber paste or equivalent onto the surface of the core wire impregnated with the RFL may optionally be used.

The hydrogenation ratio of the hydrogenated nitrile rubber to be used as the body rubber is preferably 80% to 95%, particularly preferably around 90%. At a hydrogenation ratio above 98%, the modulus value at higher temperatures is lowered, resulting in a softening phenomenon, which causes the deterioration of resistance to tooth skipping at higher temperatures. At a hydrogenation ratio below 80%, the heat resistance is poor.

As the organic peroxide to be used as the crosslinking agent, any of diacyl peroxide, peroxy ester, dialkyl peroxide, or perketal compounds can be used. In terms of processability, safety, shelf stability, reactivity and the like, practical preferred examples of the organic peroxide include di-t-butyl peroxide, dicumyl peroxide, t-butylcumyl peroxide, 1,1-di-t-butylperoxy-3,3,5-trimethylcyclohexane, 2,5-di-methyl-2,5-di(t-butylperoxy)-hexane, 2,5-di-methyl-2,5-di(t-butylperoxy)-hexane-3, bis(t-butylperoxy di-isopropyl)benzene, 2,5-di-methyl-2,5-di(benzoylperoxy)hexane, t-butylperoxy benzoate, t-butylperoxy-2-ethyl-hexylcarbonate and the like.

Of these, particular preference is given to four compounds: dicumyl peroxide, t-butylcumyl peroxide, 2-5-di-methyl-2,5-di(t-butylperoxy)hexane, and bis(t-butylperoxy di-isopropyl)benzene. Furthermore, dicumyl peroxide and bis(t-butylperoxy di-isopropyl) benzene are particularly preferred for use in large-scale production.

Currently, the most practically suitable compound is bis(t-butylperoxy di-isopropyl)benzene, because dicumyl peroxide gives products an undesirable odor. Herein, bis(t-butylperoxy di-isopropyl)benzene includes 1,3 bis(t-butylperoxy di-isopropyl)benzene and 1,4 bis(t-butylperoxy di-isopropyl)benzene as the isomers, and any of them can be used.

Organic peroxide products commercially available in general are provided by immobilizing 1,3 or 1,4 bis(t-butylperoxy di-isopropyl)benzene singly or a mixture of the two compounds onto a carrier such as calcium carbonate, silica or the like, which is then prepared in powder or molded in pellets. It can be said that to achieve the objective for the use in accordance with the present invention, almost no difference is observed between the 1,3 and 1,4 products.

The amount of an organic peroxide crosslinking agent to be used is in a ratio of from about 0.30 to about 1.51 g of the -0-0- (peroxide) group to 100 g of hydrogenated nitrile rubber polymer.

If the amount of an organic peroxide crosslinking agent used is less than 0.30 g per 100 g rubber polymer, the resistance to tooth skippage deteriorates. If the amount used is more than 1.51 g per 100 g rubber polymer, the heat resistance is decreased, and the decrease in heat resistance is accompanied by a decrease in belt moldability or elasticity. This results in an increase in the incidences of defective articles, causing difficulty in large-scale production.

As the co-crosslinking agent, at least one compound selected from the group consisting of a higher ester of an organic acid, a metal salt of acrylic acid, and a metal salt of methacrylic acid, is used in combination with N, N'-m-phenylene maleimide.

Thus, the concurrent use of two specific kinds of crosslinking agents is an important feature of the invention. If only one crosslinking agent is used an inferior result is achieved, as demonstrated in the following examples.

When the higher ester of an organic acid is used as a component of the co-crosslinking agent, this compound may be, for example, ethylene dimethacrylate, 1,3 butylene dimethacrylate, 1,4 butylene dimethacrylate, 1,6 hexanediol dimethacrylate, polyethylene glycool dimethacrylate, 1,4 butanediol diacrylate, 1,6 hexanediol diacrylate, 2,2' bis(4-methacryloxydiethoxyphenyl) propane, 2,2' bis(4-acryloxydiethoxyphenyl)propane, trimethylol propane triacrylate, trimethylol propane trimethacrylate, pentaerythritol triacrylate, 3-chloro-2-hydroxypropyl methacrylate, oligoester acrylate, triallyl isocyanurate, triallyl cyanurate, triallyl trimethylate, diallyl phthalate, and diallyl chlorenedate.

When the metal salt of acrylic acid or methacrylic acid is used as a component of the co-crosslinking agent, the salt may be, for example, aluminum methacrylate, aluminum acrylate, zinc methacrylate, zinc dimethacrylate, zinc acrylate, magnesium dimethacrylate, magnesium acrylate, calcium dimethacrylate, or calcium acrylate.

Of these, preference is given, in particular, to trimethylol propane triacrylate, trimethylol propane trimethacrylate, triallyl isocyanurate, triallyl cyanurate, zinc methacrylate, zinc dimethacrylate, and zinc acrylate.

The higher ester of an organic acid or the metal salt of acrylic acid or methacrylic acid is used, as a component of the co-crosslinking agent, concurrently with N, N'-m-phenylene dimaleimide, in a ratio from about 0.5 to about 2.0 g of the ester or salt for 100 g of a hydrogenated nitrile rubber polymer.

If the amount of the ester result is less than 0.5 g, the resistance to skipping deteriorates. On the other hand, if the amount of ester or salt is more than 2.0 g, the heat resistance decreases, and simultaneously, the moldability of the belt is impaired, resulting an increase in the incidence of defective articles, which causes difficulty in the large-scale production.

The amount of N, N'-m-phenylene dimaleimide as a component of the co-crosslinking agent, to be used concurrently with the higher ester of an organic acid or the metal salt of acrylic acid or methacrylic acid, is a ratio of from about 0.5 to about 2.0 for 100 g of hydrogenated nitrile rubber polymer.

If the amount used is less than 0.5 g, the resistance to tooth skippage deteriorates. On the contrary, if the amount used is more than 2.0 g, the heat resistance deteriorates, and simultaneously, the belt moldability decreases, resulting in increased frequency of defective articles, which causes difficulty in large-scale production.

If any one of the higher esters of an organic acid or the metal salt of acrylic acid or methacrylic acid, or N, N'-m-phenylene dimaleimide is used alone, a poor result is obtained in terms of resistance to tooth skipping.

As has been described above, the tooth cloth is impregnated with a rubber paste produced by adding an organic compound having an isocyanate group to a rubber solution produced by dissolving in an organic solvent the same hydrogenated nitrile rubber polymer as makes up the body rubber.

Examples of the organic compound having an isocyanate group are polymethylene polyphenyl isocyanate, triphenylmethane triisocyanate, tolylene diisocyanate, 4,4'-diphenylmethane diisocyanate, xylene diisocyanate, methaxylene diisocyanate, hexamethylene diisocyanate, lysine isocyanate, 4,4'-methylene bis(cyclohexyl isocyanate), methylcyclohexane 2,4(2,6) diisocyanate, 1,3-(isocyanate methyl)cyclohexane, isophorone diisocyanate, trimethylhexamethylene diisocyanate, dimeric acid isocyanate and the like.

These examples illustrate the preferred methods for preparing the toothed belt of the invention. These examples are illustrative only and do not limit the scope of the invention.

EXAMPLES

Table 1 depicts the compounding examples of the organic peroxide crosslinking hydrogenated nitrile rubber composition to be used in the present examples. That is, Examples 1 through 9 show the compositions wherein bis(t-butylperoxy di-isopropyl) benzene product (Peroxymon F-40, manufactured by NIPPON OIL AND FATS CO., LTD.; or perkadox 14-40, manufactured by Kayaku Akuzo Kabushiki Kaisha) is the organic peroxide and the higher ester of an organic acid or the metal salt of methacrylic acid being added to N,N'-m-phenylene dimaleimide as a crosslinking agent are added to a nitrile rubber polymer with a hydrogenation ratio of 90% (Z poll 2020, manufactured by Nippon Zeon Co., Ltd.) at various compounding ratios.

The bis(t-butylperoxy di-isopropyl)benzene product in Tables 1 to 3 contain an additive of calcium carbonate or silica or a mixture composed of the two at a content of 60%, so where the bis(t-butylperoxy di-isopropyl)-benzene product is 5 g, the net content of the compounds is equal to 2 g. Furthermore, the compound has two -O-O- groups, so that 2 g × 16 × 2 × 2 (two molecular weights of -O-O- group) divided by 338 (the molecular weight of the compound) = 0.38 g. Similarly, determined where the addition amount of the product is 3 g, the net content is 0.23 g. Where the addition amount of the product is 21 g, the net content is 1.59 g.

TABLE 1

| | Components | Examples (unit: g/100 g · polymer) | | | | | | | | |
|---|---|---|---|---|---|---|---|---|---|---|
| | | (1) | (2) | (3) | (4) | (5) | (6) | (7) | (8) | (9) |
| Polymer | Hydrogenated nitrile rubber Hydrogenation ratio; 90% | 100 | 100 | 100 | 100 | 100 | 100 | 100 | 100 | 100 |
| | Chloroprene rubber | | | | | | | | | |
| | Chlorosulfonated polyethylene | | | | | | | | | |
| Additives | Carbon black N550 | 50 | 50 | 50 | 50 | 50 | 50 | 50 | 50 | 50 |
| | Aging preventive agent | 3 | 3 | 3 | 3 | 3 | 3 | 3 | 3 | 3 |
| | Zinc oxide | 10 | 10 | 10 | 10 | 10 | 10 | 10 | 10 | 10 |
| | Plasticizer | 10 | 10 | 10 | 10 | 10 | 10 | 10 | 10 | 10 |
| | Stearic acid | 1 | 1 | 1 | 1 | 1 | 1 | 1 | 1 | 1 |
| | Wax | 0.5 | 0.5 | 0.5 | 0.5 | 0.5 | 0.5 | 0.5 | 0.5 | 0.5 |
| Organic peroxide: 1,3 his (t-Butylperoxy diisopropyl)benzene product | | 5 | 5 | 5 | 5 | 5 | 5 | 5 | 5 | 5 |
| Co-crosslinking agent | N,N'-m-Phenylene dimaleimide | 1 | 1 | 1 | 1 | 1.5 | 0.5 | 0.5 | 2 | 0.5 |
| | Ethylene glycol dimethacrylate (ED) | | 1 | | | | | | | |
| | Trimethylol profane trimethacrylate (TMP) | 1 | | | | 0.5 | 1.5 | | 2 | 0.5 |
| | Triallyl isocyanurate (TAIC) | | | | 1 | | | | | |
| | Zinc dimethacrylate | | | | | 1 | | 1.5 | | |
| | 1,2-Polybutadiene(—OH—) | | | | | | | | | |
| Vulcanizing agent | Magnesium oxide | | | | | | | | | |
| | Sulfur | | | | | | | | | |
| | Rubber accelerator | | | | | | | | | |
| | Calcium hydroxide | | | | | | | | | |
| | Hydrosulfite | | | | | | | | | |

Note: Organic peroxide; amount after conversion into the amount of —O—O— group (g/100 g · polymer) 21 phr = 1.59 g, 5 phr = 0.38 g, 3 phr = 0.23 g Table 2 shows the compounding examples in Comparative Example 1 wherein the polymer and the crosslinking agent are the same as those in the invention. The crosslinking agents are singly used in Comparative Examples 1 through 5. Combinations of two agents are used in Comparative Examples VI through XI.

TABLE 2

| | Components | Comparative Examples I (unit: g/100 g · polymer) | | | | | | | | | | |
|---|---|---|---|---|---|---|---|---|---|---|---|---|
| | | (1) | (2) | (3) | (4) | (5) | (6) | (7) | (8) | (9) | (10) | (11) |
| Polymer | Hydrogenated nitrile rubber Hydrogenation ratio; 90% | 100 | 100 | 100 | 100 | 100 | 100 | 100 | 100 | 100 | 100 | 100 |
| | Chloroprene rubber | | | | | | | | | | | |
| | Chlorosulfonated polyethylene | | | | | | | | | | | |
| Additives | Carbon black N550 | 50 | 50 | 50 | 50 | 50 | 50 | 50 | 50 | 50 | 50 | 50 |
| | Aging preventive agent | 3 | 3 | 3 | 3 | 3 | 3 | 3 | 3 | 3 | 3 | 3 |
| | Zinc oxide | 10 | 10 | 10 | 10 | 10 | 10 | 10 | 10 | 10 | 10 | 10 |
| | Plasticizer | 10 | 10 | 10 | 10 | 10 | 10 | 10 | 10 | 10 | 10 | 10 |
| | Stearic acid | 1 | 1 | 1 | 1 | 1 | 1 | 1 | 1 | 1 | 1 | 1 |
| | Wax | 0.5 | 0.5 | 0.5 | 0.5 | 0.5 | 0.5 | 0.5 | 0.5 | 0.5 | 0.5 | 0.5 |
| Organic peroxide: 1,3 his (t-Butylperoxy diisopropyl)benzene product | | 5 | 5 | 5 | 5 | 5 | 5 | 5 | 3 | 21 | 5 | 5 |
| Co-crosslinking agent | N,N'-m-Phenylene dimaleimide | | | | | 2 | | 2.5 | 0.4 | 1 | 1 | 2.5 |
| | Ethylene glycol dimethacrylate (ED) | 2 | | | | | | | | | | |
| | Trimethylol profane trimethacrylate (TMP) | | 2 | | | | 1 | | 0.4 | 1 | 1 | 2.5 |
| | Triallyl isocyanurate (TAIC) | | | 2 | | | | | | | | |
| | Zinc dimethacrylate | | | | | | | | | | | |
| | 1,2-Polybutadiene(—OH—) | | | | | | 2 | | | | 1 | |
| Vulcanizing agent | Magnesium oxide | | | | | | | | | | | |
| | Sulfur | | | | | | | | | | | |
| | Rubber accelerator | | | | | | | | | | | |
| | Calcium hydroxide | | | | | | | | | | | |
| | Hydrosulfite | | | | | | | | | | | |

Note: Organic peroxide; amount after conversion into the amount of —O—O— group (g/100 g · polymer) 21 phr = 1.59 g, 5 phr = 0.38 g, 3 phr = 0.23 g Table 3 shows the various compounding examples wherein chloroprene or chlorosulfonated polyethylene is used as the rubber polymer. See Comparative Examples 12 through 16.

TABLE 3

| | Components | Comparative Examples II (unit: g/100 g · polymer) | | | | |
|---|---|---|---|---|---|---|
| | | (12) | (13) | (14) | (15) | (16) |
| Polymer | Hydrogenated nitrile rubber Hydrogenation ratio; 90% | 100 | 100 | 100 | | |
| | Chloroprene rubber | | | | 100 | |
| | Chlorosulfonated polyethylene | | | | | 100 |
| Additives | Carbon black N550 | 50 | 50 | 60 | 50 | 35 |
| | Aging preventive agent | 5 | 5 | 5 | 5 | 5 |
| | Zinc oxide | 5 | 5 | 5 | 5 | 5 |
| | Plasticizer | 10 | 10 | 10 | 10 | 10 |
| | Stearic acid | | 1 | 1 | 1 | |
| | Wax | 0.5 | 0.5 | 0.5 | 0.5 | 2 |

Organic peroxide: 1,3 bis (t-Butylperoxy diisopropyl) benzene product

TABLE 3-continued

| | Components | Comparative Examples II (unit: g/100 g · polymer) | | | | |
|---|---|---|---|---|---|---|
| | | (12) | (13) | (14) | (15) | (16) |
| | (TAIC) | | | | | |
| | Zinc dimethacrylate | | | | | |
| | 1,2-Polybutadiene (—OH—) | | | | | |
| Vulcanizing agent | Magnesium oxide | | | | 4 | |
| | Sulfur | 1 | 2 | 1 | 0.5 | |
| | Rubber accelerator | 2 | 3 | 2 | 1 | |
| | Calcium hydroxide | | | | | 10 |
| | Hydrosulfite | | | | | 20 |

Note: Organic peroxide; amount after conversion into the amount of —O—O— group (g/100 g · polymer) 21 phr = 1.59 g, 5 phr = 0.38 g, 3 phr = 0.23 g Table 4 shows the properties of the rubber of the invention and the belt properties, regarding the rubber compositions shown in Table 1.

TABLE 4

| | Items for evaluation | Examples Unit | | | | | | | | |
|---|---|---|---|---|---|---|---|---|---|---|
| | | (1) | (2) | (3) | (4) | (5) | (6) | (7) | (8) | (9) |
| Properties of simple rubber | Non-vulcanization Mooney scorch ML130° C. t5 | 12.5 | 13.1 | 12.8 | 11.7 | 10.5 | 14.6 | 11.8 | 7.8 | 19.7 |
| | Atmospheric state | | | | | | | | | |
| | Rubber hardness (HS) JIS-A | 73 | 73 | 72 | 72 | 74 | 72 | 73 | 78 | 69 |
| | Tensile strength (TB) Kg/cm² | 230 | 221 | 231 | 215 | 222 | 233 | 226 | 234 | 227 |
| | Elongation (EB) % | 300 | 335 | 306 | 281 | 273 | 362 | 296 | 258 | 383 |
| | 100% modulus Kg/cm² | 50 | 49 | 49 | 51 | 52 | 47 | 48 | 74 | 43 |
| | Shear strength (TR) Kg/cm² | 55 | 56 | 55 | 55 | 48 | 53 | 52 | 49 | 61 |
| | Heat resistance (after aging at 140° C. for 288 hours) | | | | | | | | | |
| | Rubber hardness (HS) JIS-A | 80 | 80 | 80 | 80 | 82 | 79 | 80 | 83 | 78 |
| | Tensile strength (TB) Kg/cm² | 245 | 237 | 246 | 242 | 241 | 244 | 243 | 238 | 239 |
| | Elongation (EB) % | 220 | 221 | 216 | 222 | 204 | 230 | 201 | 207 | 314 |
| | 100% modulus Kg/cm² | 93 | 91 | 91 | 91 | 94 | 90 | 89 | 104 | 87 |
| | Shear strength (TR) Kg/cm² | 71 | 71 | 69 | 68 | 63 | 70 | 69 | 57 | 70 |
| Belt properties | Test A (Heat resistance) 140° C. Belt life hours | 878 | 881 | 863 | 890 | 834 | 904 | 891 | 808 | 912 |
| | Test B (Tooth-falling resistance) | | | | | | | | | |
| | Belt life room temperature · hours | 303 | 298 | 314 | 285 | 321 | 291 | 290 | 331 | 265 |
| | 100° C. · hours | 221 | 216 | 232 | 207 | 219 | 226 | 223 | 253 | 199 |

Co-crosslinking agent:
N,N'-m-Phenylene dimaleimide
Ethylene glycol dimethacrylate (ED)
Trimethylol profane trimethacrylate (TMP)
Triallyl isocyanurate Table 5 shows the properties of the rubber of the invention and the belt properties, individually, regarding the rubber compositions corresponding to Comparative Example I.

TABLE 5

| | Items for evaluation | Comparative Examples I Unit | | | | | | | | | | |
|---|---|---|---|---|---|---|---|---|---|---|---|---|
| | | (1) | (2) | (3) | (4) | (5) | (6) | (7) | (8) | (9) | (10) | (11) |
| Properties of simple rubber | Non-vulcanization Mooney scorch ML130° C. t5 | 14.4 | 13.6 | 17.1 | 8.9 | 15.2 | 7.7 | 14.8 | 15.7 | 4.3 | 12.8 | 5.2 |
| | Atmospheric state | | | | | | | | | | | |
| | Rubber hardness (HS) JIS-A | 72 | 71 | 71 | 74 | 71 | 74 | 69 | 71 | 88 | 73 | 86 |
| | Tensile strength (TB) Kg/cm² | 224 | 226 | 218 | 221 | 221 | 227 | 235 | 228 | 246 | 228 | 244 |
| | Elongation (EB) % | 331 | 367 | 380 | 260 | 351 | 230 | 398 | 380 | 121 | 298 | 129 |
| | 100% modulus Kg/cm² | 34 | 31 | 28 | 37 | 41 | 57 | 36 | 38 | 84 | 48 | 91 |
| | Shear strength (TR) Kg/cm² | 48 | 57 | 56 | 32 | 40 | 29 | 62 | 59 | 37 | 57 | 38 |
| | Heat resistance (after aging at 140° C. for 288 hours) | | | | | | | | | | | |
| | Rubber hardness (HS) JIS-A | 80 | 80 | 79 | 81 | 80 | 82 | 78 | 81 | 91 | 81 | 90 |
| | Tensile strength (TB) Kg/cm² | 232 | 233 | 226 | 228 | 231 | 231 | 244 | 241 | 258 | 239 | 236 |
| | Elongation (EB) % | 266 | 291 | 330 | 189 | 308 | 199 | 333 | 320 | 152 | 208 | 108 |
| | 100% modulus Kg/cm² | 86 | 83 | 86 | 88 | 90 | 92 | 76 | 77 | 98 | 89 | 102 |
| | Shear strength (TR) Kg/cm² | 59 | 63 | 60 | 41 | 48 | 76 | 69 | 73 | 49 | 73 | 43 |
| Belt properties | Test A (Heat resistance) 140° C. Belt life hours | 895 | 901 | 867 | 791 | 868 | 764 | 881 | 854 | 506 | 852 | 514 |
| | Test B (Tooth-falling resistance) | | | | | | | | | | | |
| | Belt life room temperature · hours | 84 | 77 | 69 | 196 | 183 | 243 | 108 | 106 | 281 | 178 | 277 |
| | 100° C. · hours | 50 | 54 | 50 | 161 | 140 | 182 | 95 | 89 | 198 | 168 | 183 |

Table 6 individually shows the properties of rubber of the invention and the belt properties, regarding the rubber compositions corresponding to Comparative Example II.

TABLE 6

|  | Items for evaluation | Comparative Examples II Unit | | | | |
|---|---|---|---|---|---|---|
|  |  | (12) | (13) | (14) | (15) | (16) |
| Properties of simple rubber | Non-vulcanization Mooney scorch ML130° C. t5 | 11.0 | 12.7 | 12.5 | 7.1 | 9.5 |
|  | Atmospheric state | | | | | |
|  | Rubber hardness (HS) JIS-A | 69 | 71 | 77 | 72 | 67 |
|  | Tensile strength (TB) Kg/cm$^2$ | 208 | 200 | 215 | 210 | 260 |
|  | Elongation (EB) % | 530 | 520 | 407 | 440 | 400 |
|  | 100% modulus Kg/cm$^2$ | 26 | 38 | 45 | 36 | 28 |
|  | Shear strength (TR) Kg/cm$^2$ | 60 | 62 | 59 | 63 | 53 |
|  | Heat resistance (after aging at 140° C. for 288 hours) | | | | | |
|  | Rubber hardness (HS) JIS-A | 84 | 85 | 89 | 97 | 83 |
|  | Tensile strength (TB) Kg/cm$^2$ | 178 | 195 | 202 | 120 | 160 |
|  | Elongation (EB) % | 155 | 150 | 121 | 30 | 200 |
|  | 100% modulus Kg/cm$^2$ | 110 | 124 | 138 | — | 69 |
|  | Shear strength (TR) Kg/cm$^2$ | 36 | 38 | 43 | 11 | 41 |
| Belt properties | Test A (Heat resistance) 140° C. | | | | | |
|  | Belt life hours | 511 | 550 | 492 | 146 | 529 |
|  | Test B (Tooth-falling resistance) | | | | | |
|  | Belt life room temperature · hours | 71 | 107 | 143 | 45 | 65 |
|  | 100° C. · hours | 46 | 84 | 111 | 27 | 40 |

EXAMPLES 1-4

The belt properties, heat resistance and tooth-skippage properties of various rubber compositions were measured. The following methods were employed.

First, heat resistance was evaluated according to the following heat resistant running test (abbreviated as "Test A" if necessary). By using a driving pulley with 19 teeth (pitch of 8 mm), a slave pulley with 19 teeth and a tester comprising an idler of a diameter of 45 mm, in a state wherein the tension of a testing belt is constantly maintained at 15 kgf and fresh hot air is continuously fed to retain the belt running atmosphere at 140° C., the testing belt is run at 4,000 r.p.m. without any load to measure the time period until cracking is induced in the back face of the testing belt or at the roots of the teeth.

The resistance to tooth skippage was evaluated by the following resistance test (abbreviated as "Test B" if necessary). By repeatedly giving, in an atmosphere at room temperature or 100° C., a shear force of 25 kgf to the teeth of a testing belt of a 19.05 mm width in an orthogonal direction to the belt-width direction at a ratio of 500 per minute, the time period required for belt tooth falling is measured.

Table 1 provides examples of the rubber compositions made according to the invention. As illustrated in Table 1, the higher ester of an organic acid or the metal salt of methacrylic acid, used in combination with N, N'-m-phenylene dimaleimide, were the co-crosslinking agents. These agents were used in the nitrile rubber polymer at a hydrogenation ratio of 90%. The results show that the heat resistance was at least 808 hours and at the maximum was the extremely high value of 912 hours. Regarding the resistance to tooth skippage, also, the belt life at room temperature was at least 290 hours and the belt life at 100° C. was at least 199 hours. Both of these are very high values.

In contrast, the crosslinking agents used in the present invention were used alone in Comparative Examples I through IV. No satisfactory properties were obtained in test B (resistance to tooth skippage), although excellent heat resistance properties were shown in Test A.

EXAMPLE V

In comparative Example V, the terminally carboxylated polybutadiene used in the invention of Japanese patent Laid-open No. 269743/1989, cited above, were used alone. The heat resistance was relatively high but the tooth-falling resistance was considerably poorer than those of the present invention. Particularly, the belt life at 100° C. is 140 hours, which was far lower than those of the invention.

EXAMPLE VI

Comparative Example IV was an example wherein trimethylol propane methacrylate (TMP) and N, N'-m-phenylene dimaleimide were concurrently used as the co-crosslinking agent in accordance with the invention, in a nitrile rubber polymer at a hydrogenation ratio of 90%. The compounding ratios were 1 g of TMP and 2.5 g of N, N'-m-phenylene dimaleimide to 100 g of the polymer, exceeding the 2.0 g upper limit of the range. In this case, excellent properties were shown at Test A (heat resistance) and Test B (resistance to tooth skippage), but the scorch time was distinctly short, so stable production was difficult. Thus, this compounding ratio was not desirable.

EXAMPLE VII

Comparative Example VII is an example wherein trimethylol propane methacrylate (TMP) and N, N'-m-phenylene dimaleimide were used, in accordance with the invention as a co-crosslinking agent, in a nitrile rubber polymer at a hydrogenation ratio of 90%. The compounding ratios are 0.4 g of TMP and 0.4 g of N,N'-m-phenylene dimaleimide to 100 g of the polymer, both ratios being less than the lower end of the range (less than 0.5 g). In this case, more or less satisfactory values are shown in Test A (heat resistance) but only extremely low values are obtained at Test B (resistance to tooth skipping).

EXAMPLE VIII

In Comparative Examples VIII and IX, the compounding ratio of bis(t-butylperoxy di-isopropyl)benzene as an organic peroxide was modified. That is, in Comparative Example VIII, the ratio was defined as 3 g, and if converted into the amount of the peroxide (-O-O-) group, it corresponds to 0.23 g which is below the lower limit of the limiting range, namely 0.30 g. In this case, slightly satisfactory values were shown at Test A (heat resistance) but only lower values were obtained at Test B (resistance to tooth skippage).

EXAMPLE IX

In comparative Example IX, 21 g of the same organic peroxide as described above were used. If converted into the amount of the -O-O- group, it corresponds to 1.59 g which is above the upper limit of the limiting range, namely 1.51 g. In this case, very poor results were shown at Test A (heat resistance), but nearly satisfactory values were obtained at Test B (resistance to tooth skippage).

EXAMPLE X

Comparative Example X is an example wherein the same polybutadiene as in Comparative Example V was used in combination with N, N'-m-phenylene dimaleimide, and the results showed almost no improvements over Comparative Example V.

EXAMPLE XI

Comparative Example XI is an example wherein trimethylol propane methacrylate (TMP) and N, N'-m-phenylene dimaleimide are used together. The compounding ratio was 2.5 g of TMP and 2.5 g of N, N'-m-phenylene dimaleimide to 100 g of the polymer, both exceeding the 2.0 g upper limit of the range. In this case, very bad results were observed in Test A (heat resistance) and somewhat poor results were shown in Test B (resistance to tooth skippage).

EXAMPLES XII–XVI

Comparative Examples XII through XIV as a group of studies run under the same conditions as Comparative Example II, individually showed the properties of belts made from a sulfur crosslinking hydrogenated nitrile rubber polymer. Comparative Example XV shows the properties of the belt when it was made of a chloroprene rubber polymer. Comparative Example XVI shows the properties of the belt when it was made of chlorosulfonated polyethylene rubber polymer. The properties are poor for both Test A and Test B.

As was demonstrated by the above examples, the toothed belt according to the invention can withstand remarkably increased heat resistance and exhibits increased resistance to tooth skipping. This belt has a prolonged belt life because the tooth rubber and back rubber are made of a cured polymer of an organic peroxide crosslinking hydrogenated nitrile rubber compound containing N, N'-m-phenylene dimaleimide, and one or two or more compounds selected from the higher ester of an organic acid and the metal salt of acrylic acid or methacrylic acid. The tooth cloth is bonded to the exposed surface of the tooth rubber, the back rubber and the tension member with a rubber paste containing an organic compound having an isocyanate group in a rubber solution produced by dissolving in an organic solvent the same rubber composition as in the tooth rubber and the back rubber.

Because the toothed belt according to the present invention is excellent in resisting tooth skippage, the belt can be used as a driving toothed belt under the same load even if the belt width is narrowed.

Furthermore, the toothed belt of the invention has excellent heat resistance and resistance to tooth skippage at higher temperatures under high loads, so that the belt is useful as the toothed belt in the camshaft drive of automobile engines demanding high performance and high loading.

Numerous modifications and variations of the invention, beyond those included in the specification can be made without departing from the scope of the invention as defined in the following claims.

What is claimed is:

1. A toothed belt comprising tooth rubber, back rubber, a tension member and tooth cloth, wherein the tooth rubber and the back rubber are molded and cured and comprise an organic peroxide-crosslinked hydrogenated nitrile rubber polymer, and a co-crosslinking agent comprising N, N'-m-phenylene dimaleimide in combination with at least one compound selected from the group consisting of a higher ester of an organic acid, a metal salt of acrylic acid, and a metal salt of methacrylic acid.

2. The toothed belt according to claim 1, wherein, for every 100 g of the hydrogenated nitrile rubber, the composition contains from about 0.30 to about 1.51 g peroxide based upon the weight of the peroxide group of the organic peroxide, from about 0.5 to about 2.0 g N, N'-m-phenylene dimaleimide, and from about 0.5 to about 2.0 g of the at least one compound selected from the group consisting of a higher ester of an organic acid, a metal salt of acrylic acid, and a metal salt of methacrylic acid.

3. A method for producing a toothed belt composed of tooth rubber, back rubber, a tension member and tooth cloth; said method comprising the step of preparing the tooth rubber and the back rubber by an organic peroxide crosslinked hydrogenated nitrile rubber composition and a co-crosslinking agents comprising N, N'-m-phenylene dimaleimide and at least one compound selected from the group consisting of a higher ester of an organic acid, a metal salt of acrylic acid, and a metal salt of methacrylic acid; and the step of bonding the tooth cloth to a surface of the tooth rubber and the back rubber by a rubber paste produced by adding an organic compound having an isocyanate group to a rubber solution produced by dissolving, in an organic solvent, an organic peroxide crosslinking hydrogenated nitrile rubber composition containing as a co-crosslinking agent, a composition comprising N,N'-m-phenylene dimaleimide and at least one compound selected from the group consisting of a higher ester of an organic acid, a metal salt of acrylic acid, and a metal salt of methacrylic acid.

* * * * *

UNITED STATES PATENT AND TRADEMARK OFFICE
CERTIFICATE OF CORRECTION

PATENT NO. : 5,234,387
DATED : August 10, 1993
INVENTOR(S) : Fujiwara et al.

It is certified that error appears in the above-identified patent and that said Letters Patent is hereby corrected as shown below:

Column 4, line 37, after "2.0" a --g-- should be inserted;
Column 5, line 2, "cl" should be deleted and "EXAMPLES" should by centered on the next line;
Column 5, line 32, "perkadox" should be --Perkadox--;
Column 7, parts of Table 3 are printed mistakenly after Table 4 and after Table 5;
Column 8, line 66, "p" before Table 6 should be deleted.

Signed and Sealed this

Fifteenth Day of March, 1994

BRUCE LEHMAN

Attest:

Attesting Officer

Commissioner of Patents and Trademarks